A. V. MITCHELL.
COMBINED TIRE AND RIM FOR WHEELS.
APPLICATION FILED JULY 8, 1914.
1,264,957.
Patented May 7, 1918.
2 SHEETS—SHEET 1.
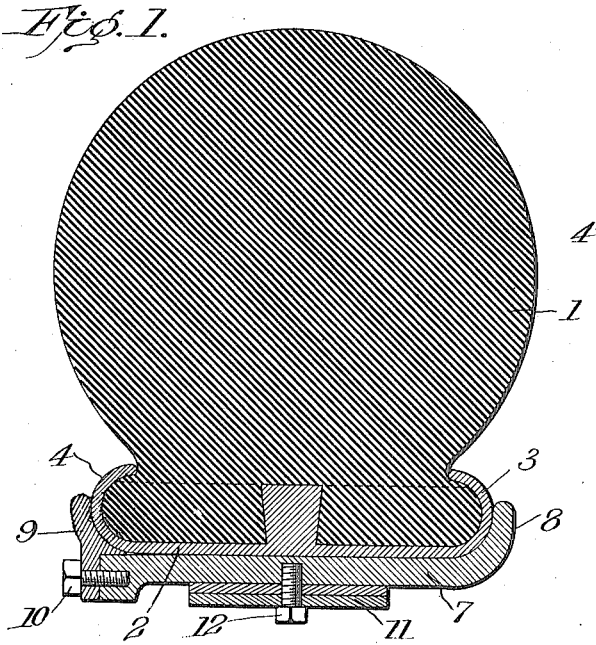
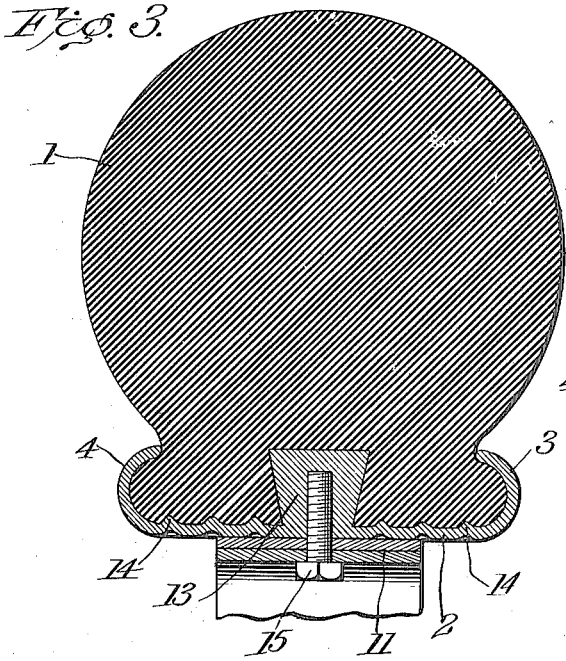
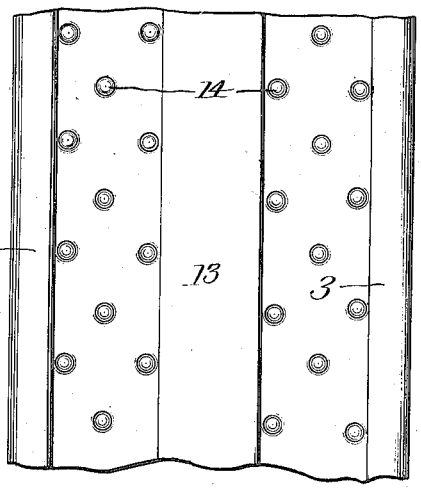
Witnesses
G. F. Baker
G. C. Denny
Inventor
Augusta V. Mitchell
By Foster, Freeman, Watson & Coit
Attorneys A. V. MITCHELL.
COMBINED TIRE AND RIM FOR WHEELS.
APPLICATION FILED JULY 8, 1914.
1,264,957.
Patented May 7, 1918.
2 SHEETS—SHEET 2.
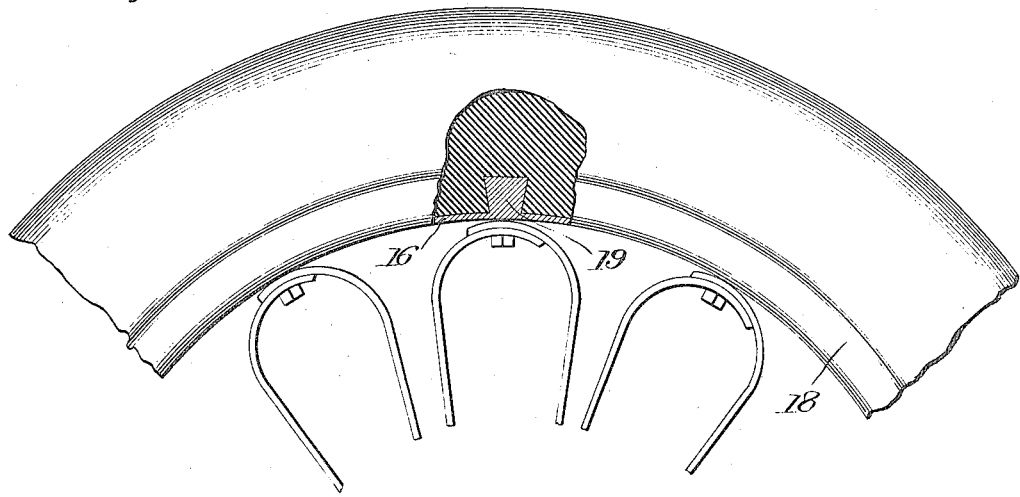
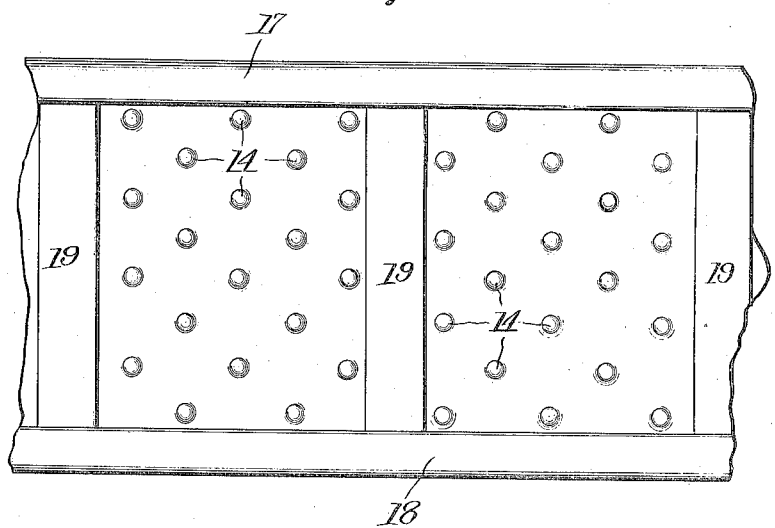

UNITED STATES PATENT OFFICE.

AUGUSTA V. MITCHELL, OF WASHINGTON, DISTRICT OF COLUMBIA.

COMBINED TIRE AND RIM FOR WHEELS.

1,264,957.     Specification of Letters Patent.     Patented May 7, 1918.

Application filed July 8, 1914. Serial No. 849,814.

*To all whom it may concern:*

Be it known that I, AUGUSTA V. MITCHELL, a citizen of the United States of America, and resident of Washington, District of Columbia, have invented certain new and useful Improvements in Combined Tires and Rims for Wheels, of which the following is a specification.

This invention relates to vehicle wheels of that type making use of rubber tires and it has particular reference to the construction of the rim and the means for securing the rubber tire therein. The novel features of the invention will be apparent from the following description, taken in connection with the drawings.

In the drawings,

Figure 1 is a cross section of the rim and tire showing one form of my invention;

Fig. 2 is a plan view of the rim showing the form illustrated in Fig. 1;

Fig. 3 is a cross section of a modified form of the invention;

Fig. 4 is a plan view of the rim as shown in Fig. 3;

Fig. 5 is a side elevation partly broken away showing another modification; and

Fig. 6 is a plan view of the rim shown in Fig. 5 with the tire removed.

In the form of the invention shown in Fig. 1, a rubber tire 1 which is preferably made solid and of the form shown in the drawing is placed in the sheet metal rim 2 having the upwardly projecting side walls 3 and 4 which may be curved in the usual way as shown. The rim has on its outer face strengthening ribs 5, 6, which cross each other and which stand up from the face of the rim to a height almost equal to that of the side flange. The rubber tire fits over these diagonal cross-pieces having grooves in its bottom for the purpose. The rubber tire is placed on the rim and is secured in position by vulcanization after it has been placed on the rim.

The rim as above described may be made demountable as is shown in Fig. 1. It may be so constructed as to slide over the outer surface of the main rim 7 of the wheel until it strikes against the flange 8, and it is then held in place in any suitable way as by the wedge 9 secured by the bolt 10. The main rim 7, of course, forms a permanent part of the wheel, and I have shown the ends of the spokes 11 which connect that rim with the hub to complete the wheel, these spokes being held in place by the bolt 12.

In Fig. 3 I have shown the preferred means for securing the rubber tire to the rim, but it will be understood that the rim and tire as shown in this figure may be made demountable in the same way as the form shown in Fig. 1. In Fig. 3, the tire 1 fits within the rim 2 having the side curved walls 3 and 4, and in this instance there is a longitudinal rib 13 which is arranged on the outer face of the rim circumferentially, and this rib is undercut on its sides so that the rubber of the tire enters underneath the upper edge. To prevent longitudinal slipping of the rubber in the rim, I indent the bottom of the sheet metal rim so as to make rounded projections 14. It will be observed that these projections serve the same purpose in so far as preventing the creeping of the tire around the rim as do the diagonal ribs 5 and 6 in the form shown in Fig. 1. In Fig. 3, I have shown the rim secured directly to the spring spokes 11 by means of the bolt 15 but as above stated, the rim may be detachable and may be placed on the main rim of the wheel, as shown in Fig. 1. In this instance, as in that shown in Fig. 1, the tire is vulcanized in place on the rim and therefore it is securely fastened in place. The tires and rims, being made together, will of course be sold together as a complete combination so that they can be bought and applied to the wheels.

In the form shown in Figs. 5 and 6, the sheet metal rim 16 has the side flanges 17, 18 which may be formed in any suitable or preferred way, and the construction may be similar to that shown in Fig. 3. Cross pieces 19 are placed or formed within the rim and they have undercut sides as shown clearly in Fig. 5. These cross pieces 19 are placed at intervals around the circumference of the rim and between them the surface of the rim may be punched or bent to form the projections 14. The cross pieces, together with the projections, serve to securely hold the tire in place on the rim when it is vulcanized in position, preventing any creeping of the tire around the rim.

Having thus described my invention, what I claim is:

1. In a device of the class described, the combination with a metal wheel rim having upturned side flanges and spaced rounded projections formed on its surface, of a circumferential rib on the outer surface of said rim between said side flanges having undercut sides, and a rubber tire fitting in said rim and vulcanized in place.

2. In a device of the class described, the combination of a metal wheel rim having side flanges provided with inwardly turned upper edges, a solid rubber tire vulcanized in place on said rim and engaged by said inwardly turned edges, and a rib on the outer surface of said rim having undercut sides and projecting into said tire to prevent slipping on the rim, said rim having spaced rounded projections on its outer surface also projecting into said tire.

In testimony whereof I affix my signature in presence of two witnesses.

AUGUSTA V. MITCHELL.

Witnesses:
Lou H. Cadarr,
Arthur L. Bryant.